(12) United States Patent
Mercante

(10) Patent No.: US 11,019,963 B1
(45) Date of Patent: Jun. 1, 2021

(54) DOUBLE JIGGER

(71) Applicant: Thomas William Mercante, Summerville, SC (US)

(72) Inventor: Thomas William Mercante, Summerville, SC (US)

( * ) Notice: Subject to any disclaimer, the term of this patent is extended or adjusted under 35 U.S.C. 154(b) by 90 days.

(21) Appl. No.: 16/679,179

(22) Filed: Nov. 9, 2019

(51) Int. Cl.
*G01F 19/00* (2006.01)
*A47J 43/27* (2006.01)

(52) U.S. Cl.
CPC .............. *A47J 43/27* (2013.01); *G01F 19/00* (2013.01)

(58) Field of Classification Search
CPC .......... G01F 19/00; G01F 19/002; A47J 43/27
USPC .......................................................... 73/427
See application file for complete search history.

(56) References Cited

U.S. PATENT DOCUMENTS

| | | | | |
|---|---|---|---|---|
| 566,067 | A * | 8/1896 | Duck | B65D 1/04 215/6 |
| 2,143,027 | A * | 1/1939 | Perry | A47G 19/2261 215/374 |
| D534,037 | S * | 12/2006 | Oas | D7/507 |
| D589,752 | S * | 4/2009 | Fetting | D7/510 |
| D615,363 | S * | 5/2010 | Lion | D7/524 |
| 10,209,116 | B2 * | 2/2019 | Alam | G01F 23/64 |
| 2010/0050766 | A1* | 3/2010 | Silvers | G01F 19/00 73/426 |
| 2010/0229643 | A1* | 9/2010 | Lee | G01F 19/00 73/426 |

* cited by examiner

*Primary Examiner* — Jamel E Williams
(74) *Attorney, Agent, or Firm* — Michael D. Eisenberg

(57) ABSTRACT

A double jigger comprises two cup portions. Each cup portion faces in an opposite direction from one another and each has an open top for receiving a liquid or a pourable solid and a bottom which leads to a common open channel. A pliable center portion is disposed between and connects the two cup portions and contains the common open channel. The channel is subject to blockage upon application of exterior pressure on the pliable center portion, for example, if a user were to pinch the center portion between a thumb and fingers.

18 Claims, 4 Drawing Sheets

DOUBLE JIGGER

TECHNICAL FIELD

This invention relates to jiggers.

BACKGROUND OF THE INVENTION

The present invention addresses the need to improve pouring and measuring liquids in environments where speed and minimizing spills is desired.

BRIEF SUMMARY OF EMBODIMENTS OF THE INVENTION

According to one embodiment of the invention, a double jigger comprises two cup portions. Each cup portion faces in an opposite direction from one another and each has an open top for receiving a liquid or a pourable solid and a bottom which leads to a common open channel. A pliable center portion is disposed between and connects the two cup portions and contains the common open channel. The channel is subject to blockage upon application of exterior pressure on the pliable center portion, for example, if a user were to pinch the center portion between a thumb and fingers.

In a variant of the double jigger, the two cup portions and the center portions are all pliable.

In another variant, the two cup portions and the center portions are all formed of the same material.

In a further variant, the two cup portions are formed from a rigid material.

In still another variant, the two cup portions both have diameters at least twice as large as a diameter of the center portion.

In yet a further variant, the cup portions have widths greater than a width of the center portion and the width of the center portion is less than one inch.

In a variant, the width of the center portion is less than 9/10 inch. In another variant, the width of the center portion is less than 4/5 inch. In other variant, the width of the center portion may be less than: 7/10 inch, 3/5 inch, 1/2 inch, 2/5 inch, 1/4 inch or less than 1/5 inch.

In a further variant, the center portion has side walls that extend below the cup portions and form walls of the common open channel. The width of the open channel is less than widths of both bottoms of the cup portions.

In yet another variant, the center portion has flap that when external pressure is applied to the center portion, opens and wherein the flap closes when pressure is released.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1:
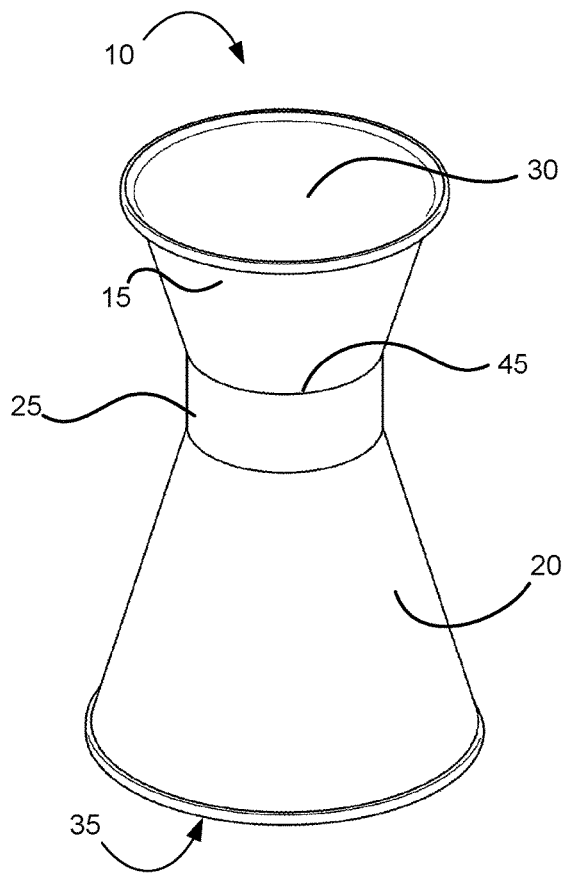
FIG. 1 is perspective view of a preferred embodiment of a double jigger in accordance with the principles of the invention.
Figure 2:
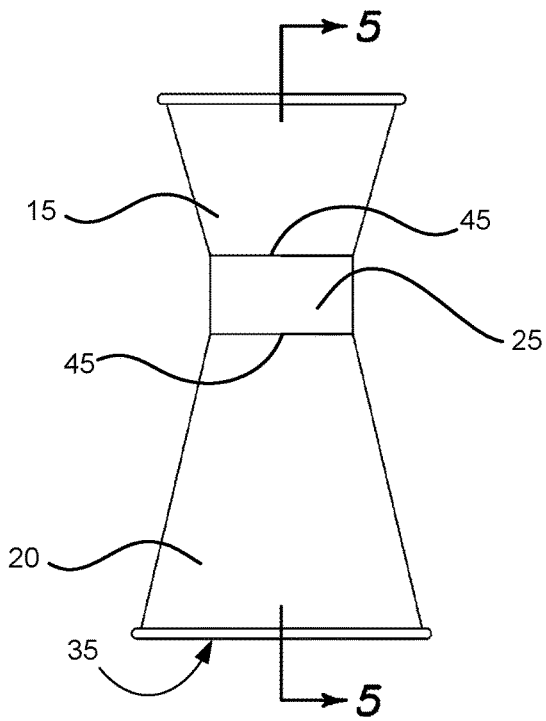
FIG. 2 is side view of the double jigger of FIG. 1.
Figure 3:
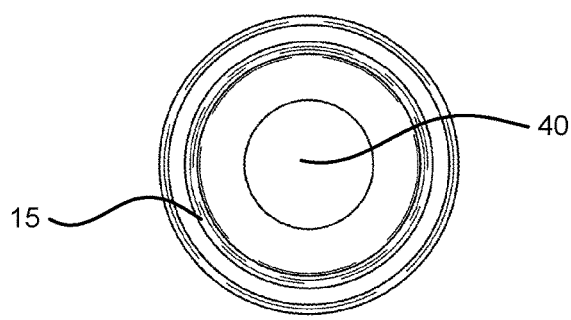
FIG. 3 is a top view of the double jigger of FIG. 1.
Figure 4:
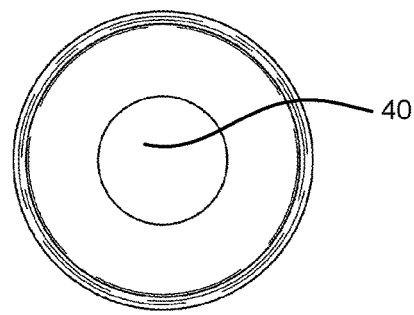
FIG. 4. is a bottom view of the double jigger of FIG. 1.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Referring to FIGS. 1-4, a double jigger 10 comprises two cup portions 15, 20. Each cup portion 15, 20 faces in an opposite direction from one another and each has an open top end 30, 35 for receiving a liquid or a pourable solid and a bottom 45 which leads to a common open channel 40 through which liquid or pourable solids may pass through. A pliable center portion 20 is disposed between and connects the two cup portions 15, 20 and contains the common open channel 40. The channel 40 is subject to blockage upon application of exterior pressure on the pliable center portion 25, for example, if a user were to pinch the center portion between a thumb and fingers. Optionally, sides of the double jiggers are tapered, and gradually narrow until the center portion.

In operation, a user would grip the double jigger and pinch the center portion in their fingers and pinch it to close the channel 40. The user would then fill the jigger facing up with a liquid to the desired level. The user would then hold the double jigger over a vessel and then release their pinch of the center portion 25 and allow the channel 40 to open up and liquid to fall into the vessel. An advantage of present invention is that it reduces the likelihood of spills when operating quickly as the double jigger does not need to be tipped to transfer its contents to a vessel.

Figure 5:
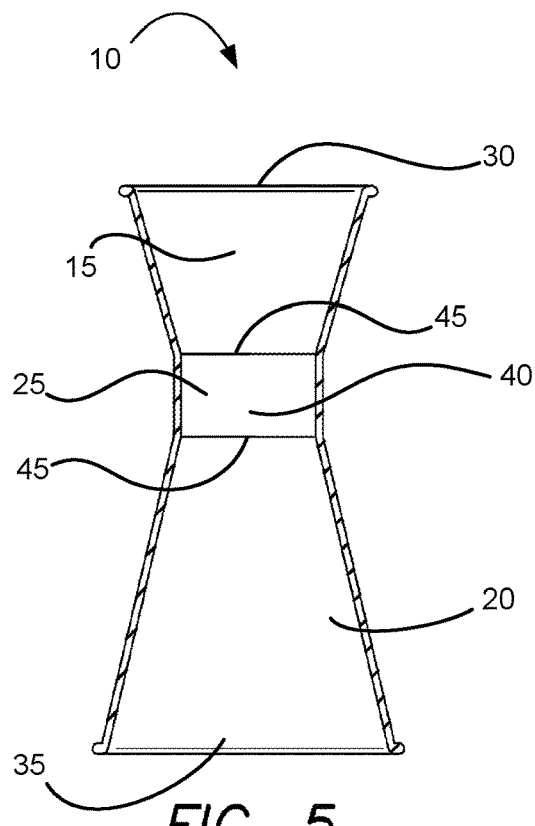
FIG. 5 is a sectional view through the line 5-5 of the double jigger of FIG. 1 illustrating the jigger is formed of a single pliable material.

In a variant of the double jigger, referring to FIG. 5, the two cup portions and the center portions are all pliable and formed of the same material. The material may be silicone or any suitable food grade material that is pliable and flexible enough to be able to be pinched closed.

Figure 6:
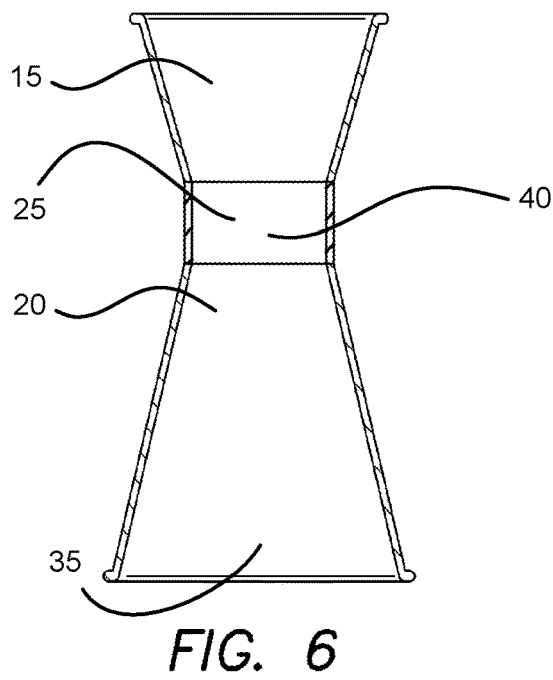
FIG. 6 is a sectional view through the line 5-5 of the double jigger of FIG. 1 illustrating a variant, where the jigger is formed of a pliable material in the center portion and a rigid material in the cup portions.

In a further variant, referring to FIG. 6, the two cup portions 15, 20 are formed from a rigid material, such as metal or wood or plastic.

Figure 9:
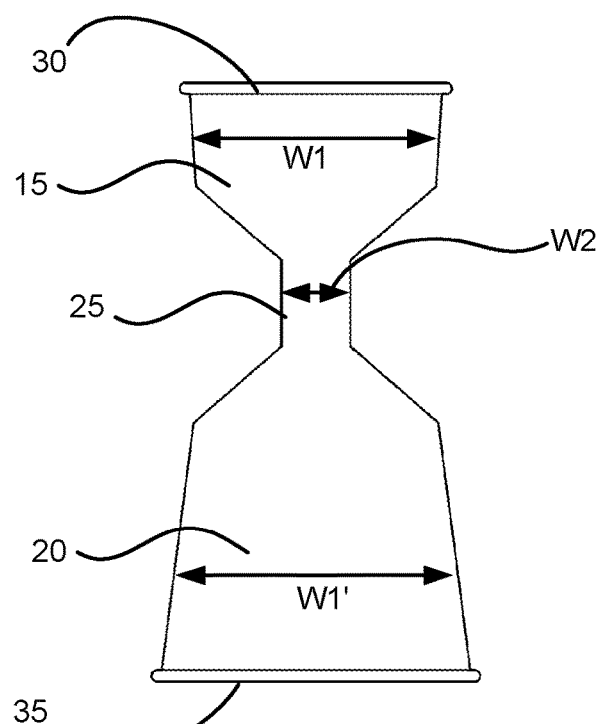
FIG. 9 is a side view of another variant of the double jigger.
Figure 10:
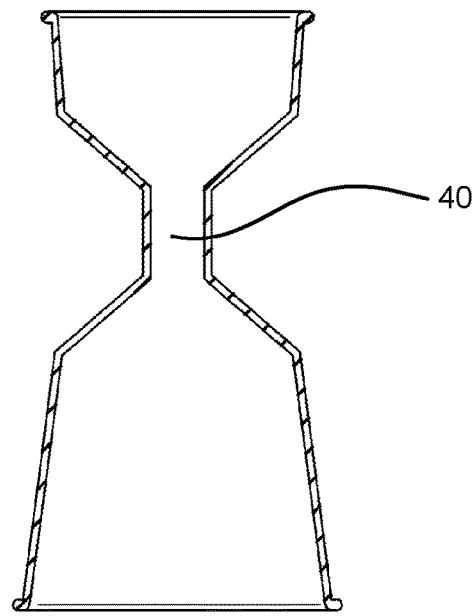
FIG. 10 is a sectional view of the double jigger of FIG. 9.

In still another variant, referring to FIGS. 9 and 10, the two cup portions 15, 20 both have diameters W1, W1' at least twice as large as a diameter W2 of the center portion.

In yet a further variant, the cup portions have widths W1, W1' greater than a width W2 of the center portion and the width of the center portion is less than one inch.

In a variant, the width W2 of the center portion is less than 9/10 inch. In another variant, the width W2 of the center portion is less than 4/5 inch. In other variants, the width W2 of the center portion may be less than: 7/10 inch, 3/5 inch, 1/2 inch, 2/5 inch, 1/4 inch or less than 1/5 inch.

Figure 7:
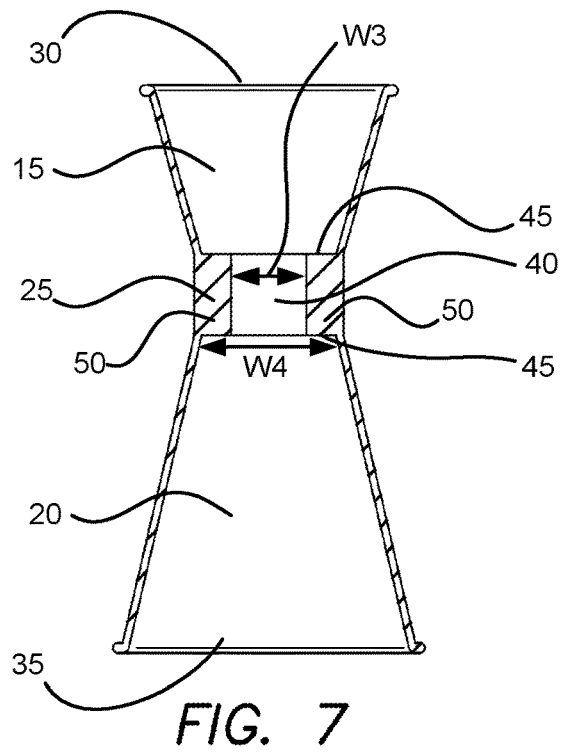
FIG. 7 is a sectional view of an alternative embodiment of the double jigger.
Figure 8:
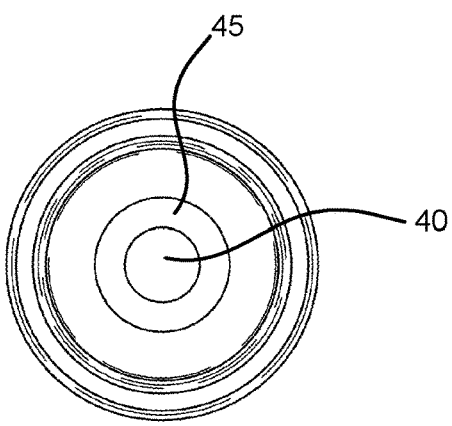
FIG. 8 is a top view of the double jigger of FIG. 7.

In a further variant, referring to FIGS. 7 and 8, the center portion 25 has side walls 50 that extend below the cup portions 15, 20 and form walls of the common open channel 40. The width W3 of the open channel is less than widths W4 of both bottoms 45 of the cup portions.

Figure 11:
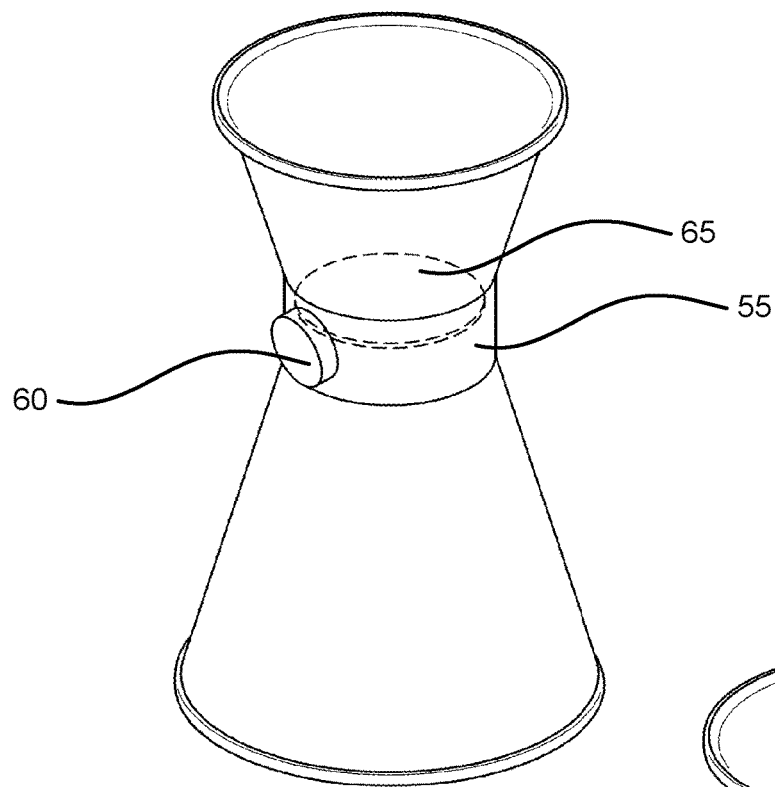
FIGS. 11 and 12 are of a double jigger that has a center portion that has a trap door mechanism and a button.
Figure 12:
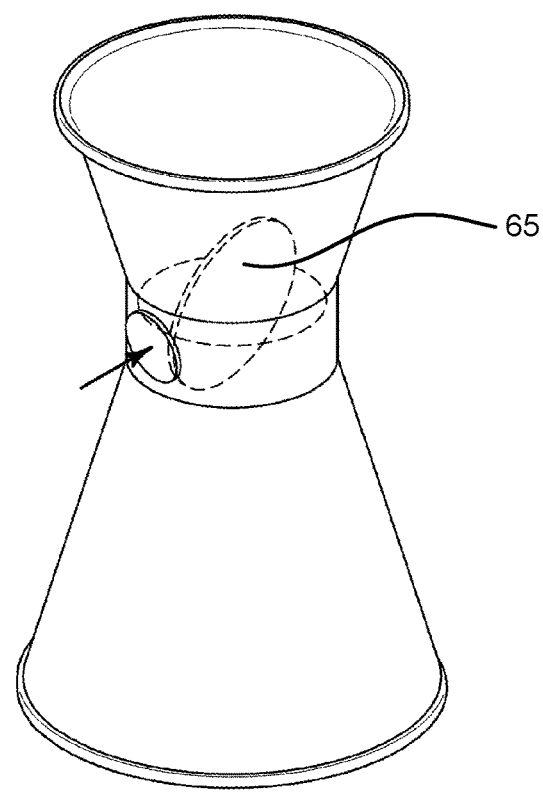

In another variant, referring to FIGS. 11 and 12, the double jigger has center portion 25 that has a trap door 65 mechanism 55 and a button 60 that, when pressed, rotates from a horizontal position towards a vertical position to allow fluid to pass through the center potion 55 of the jigger.

In yet another variant, the center portion has flap that when external pressure is applied to the center portion, opens and wherein the flap closes when pressure is released.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention.

What is claimed is:

1. A double jigger, comprising:
   two cup portions, each cup portion facing in opposite directions from one another and each having an open top for receiving a liquid or a pourable solid and a bottom which leads to a common open channel;
   a pliable center portion, disposed between and connecting the two cup portions and containing the common open channel, wherein the channel is subject to blockage upon application of exterior pressure on the pliable center portion.

2. The double jigger of claim 1, wherein two cup portions and the center portions are all pliable.

3. The double jigger of claim 2, wherein two cup portions and the center portions are all formed of the same material.

4. The double jigger of claim 1, wherein two cup portions are formed from a rigid material.

5. The double jigger of claim 1, wherein two cup portions both have diameters at least twice as large as a diameter of the center portion.

6. The double jigger of claim 1, wherein the cup portions have widths greater than a width of the center portion and the width of the center portion is less than one inch.

7. The double jigger of claim 6, wherein the width of the center portion is less than 9/10 inch.

8. The double jigger of claim 6, wherein the width of the center portion is less than 4/5 inch.

9. The double jigger of claim 6, wherein the width of the center portion is less than 7/10 inch.

10. The double jigger of claim 6, wherein the width of the center portion is less than 3/5 inch.

11. The double jigger of claim 6, wherein the width of the center portion is less than 1/2 inch.

12. The double jigger of claim 6, wherein the width of the center portion is less than 2/5 inch.

13. The double jigger of claim 6, wherein the width of the center portion is less than 1/4 inch.

14. The double jigger of claim 6, wherein the width of the center portion is less than 1/5 inch.

15. The double jigger of claim 1, wherein the center portion has side walls that extend below the cup portions and form walls of the common open channel, wherein the width of the open channel is less than widths of both bottoms of the cup portions.

16. The double jigger of claim 1, wherein the center portion has flap that when external pressure is applied to the center portion, opens and wherein the flap closes when pressure is released.

17. The double jigger of claim 1, wherein the center portion has a door mechanism and a button that, when pressed, rotates from a horizontal position towards a vertical position to allow fluid to pass through the center potion of the jigger.

18. The double jigger of claim 17, wherein the door is round to match an inner dimension of the center portion.

* * * * *